1666999B2

United States Patent
Mizoguchi

(10) Patent No.: US 11,666,999 B2
(45) Date of Patent: Jun. 6, 2023

(54) THERMAL DISPLACEMENT CORRECTION METHOD AND THERMAL DISPLACEMENT CORRECTION APPARATUS OF MACHINE TOOL

(71) Applicant: OKUMA CORPORATION, Niwa-Gun (JP)

(72) Inventor: Yuji Mizoguchi, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 464 days.

(21) Appl. No.: 16/726,399

(22) Filed: Dec. 24, 2019

(65) Prior Publication Data
US 2020/0230764 A1 Jul. 23, 2020

(30) Foreign Application Priority Data
Jan. 21, 2019 (JP) .............................. JP2019-007947

(51) Int. Cl.
*B23Q 3/155* (2006.01)
*G05B 19/404* (2006.01)
*B23Q 11/00* (2006.01)

(52) U.S. Cl.
CPC ........ *B23Q 3/1552* (2013.01); *B23Q 11/0007* (2013.01); *G05B 19/404* (2013.01);
(Continued)

(58) Field of Classification Search
CPC ......... B29C 48/92; B29C 48/08; B29C 48/10; B29C 2948/9279; B29C 2948/9218;
(Continued)

(56) References Cited

U.S. PATENT DOCUMENTS 7,354,386 B2 4/2008 Iefuji
11,249,454 B2 * 2/2022 Maekawa ............ G05B 19/408
(Continued)

FOREIGN PATENT DOCUMENTS

CN 106371404 A 2/2017
JP 2004-148443 A1 5/2004
(Continued)

OTHER PUBLICATIONS

Chinese Office Action (with English translation) dated Dec. 19, 2022 (Application No. 202010052986.2).

*Primary Examiner* — Thomas C Lee
*Assistant Examiner* — Ameir Myers
(74) *Attorney, Agent, or Firm* — Burr Patent Law, PLLC

(57) ABSTRACT

A thermal displacement correction method is provided, including a first step of setting an initial tool temperature, a second step of estimating a temperature of a tool or a position measurement sensor based on the initial tool temperature and a temperature of a spindle, a third step of estimating an amount of thermal displacement of the tool or the position measurement sensor with a preliminarily set tool thermal displacement estimation formula based on the estimated temperature, and a fourth step of moving a feed shaft of the machine tool based on the estimated amount of thermal displacement to perform a correction. In the second step, the temperature of the spindle is measured, then a tool-mounted portion temperature of the spindle is estimated from the measured temperature.

5 Claims, 5 Drawing Sheets

(52) U.S. Cl.
CPC ............ *G05B 2219/37428* (2013.01); *G05B 2219/49207* (2013.01); *G05B 2219/49219* (2013.01)

(58) Field of Classification Search
CPC ........... B29C 2948/92228; B29C 2948/92295; G05B 19/4183; G05B 19/41865; G05B 19/41875; G05B 2219/31376; G05B 2219/32368; G05B 2219/45234; Y02P 90/02; B29K 2101/12
See application file for complete search history.

(56) References Cited

U.S. PATENT DOCUMENTS

| | | | |
|---|---|---|---|
| 2007/0105697 A1* | 5/2007 | Iefuji .................... | B23Q 3/155 700/193 |
| 2008/0144693 A1* | 6/2008 | Sato ....................... | G01K 15/00 374/1 |
| 2008/0215178 A1* | 9/2008 | Senda ................ | B23Q 11/0007 700/175 |
| 2012/0123586 A1* | 5/2012 | Maekawa ............ | G05B 19/404 700/173 |
| 2017/0023417 A1 | 1/2017 | Koyama | |
| 2019/0056711 A1* | 2/2019 | Meier .................. | G05B 19/406 |

FOREIGN PATENT DOCUMENTS

| | | |
|---|---|---|
| JP | 4469325 B2 | 5/2010 |
| JP | 2010-172981 A1 | 8/2010 |

\* cited by examiner

THERMAL DISPLACEMENT CORRECTION METHOD AND THERMAL DISPLACEMENT CORRECTION APPARATUS OF MACHINE TOOL

BACKGROUND OF INVENTION

This application claims the benefit of Japanese Patent Application No. 2019-007947 filed on Jan. 21, 2019, the entirety of which is incorporated by reference.

FIELD OF THE INVENTION

The disclosure relates to a method and an apparatus that correct thermal displacement of a tool and a position measurement sensor used to be mounted to a spindle of a machine tool to improve processing accuracy and measurement accuracy.

BACKGROUND OF THE INVENTION

In a machining center, a position measurement sensor, such as a touch trigger probe, is mounted to a spindle, and measurement of a workpiece origin position, measurement of workpiece dimensions after machining, calibration of machine accuracy, and the like are performed.

However, depending on the method of use, thermal distortion possibly occurs in the touch trigger probe and position measurement accuracy is deteriorated. For example, when the touch trigger probe is mounted to the spindle immediately after the spindle is rotated at high speed for machining and the position measurement is performed, transmission of heat of the spindle to the touch trigger probe generates the thermal distortion, thus deteriorating the measurement accuracy. Similarly, also in the case where a reference tool is mounted to the spindle and the origin position of the workpiece is set, when the reference tool is mounted to the spindle immediately after a shaft is rotated at high speed for machining and measurement is performed, transmission of heat of the spindle to the reference tool generates the thermal distortion, thus possibly deteriorating the measurement accuracy.

Due to the above-described problems, the measurement needs to be performed with the spindle in a cooled state for accurate measurement. Conventionally, when the spindle is rotated for machining and then the measurement is performed, it has been necessary to wait until the spindle is stopped and cooled.

Meanwhile, a technique that corrects thermal displacement due to heat generated in spindle, which causes a problem in a machine tool, has been widely used. For example, JP-A-2004-148443, Japanese Patent No. 4469325, and JP-A-2010-172981 describe a method for correcting thermal displacement of a tool due to an influence from heat generated in a spindle.

JP-A-2004-148443 describes a method for estimating a temperature change of the tool from a first-order lag expression based on a temperature difference between a temperature near a bearing of a spindle in a machine tool and a temperature at a part where thermal stability is high. Furthermore, JP-A-2004-148443 describes that a parameter used in the first-order lag expression is changed depending on types of the tool and a tool holder to ensure estimation optimal for each tool.

Japanese Patent No. 4469325 describes a method that, to ensure handling a transitional change in tool temperature after mounting the tool, the tool temperature in use is estimated and corrected based on a tool temperature immediately before the use and a temperature of a spindle. Furthermore, the method preliminarily records a use history of each tool and estimates the temperature change of each tool between when the tool is mounted to the spindle and when the tool is stored in a tool magazine, thus ensuring accurately estimating an initial temperature when the tool is mounted.

JP-A-2010-172981 describes a technique that corrects displacement due to drawing-in when a tool is mounted of the tool with a taper-shaped mounting portion (what is called a BT shank tool). The disclosure obtains a temperature rise value of a tool-mounted portion using a temperature near a bearing of a spindle and calculates an amount of drawing-in of the tool based on a formula preliminarily obtained from the temperature rise value to correct displacement caused by the drawing-in of the tool.

However, the disclosure of JP-A-2004-148443 does not consider an initial temperature when the tool is mounted. Actually, after the tool is mounted to the spindle, the tool temperature gradually increases, however, the disclosure assumes that, when the tool is mounted, the tool temperature instantaneously matches an estimated tool temperature calculated from the spindle temperature. With the method, an estimation error in a transient state where the tool temperature changes after the tool is mounted is large.

The disclosure of Japanese Patent No. 4469325 estimates the tool temperature in use based on the tool temperature immediately before the use and the spindle temperature to ensure accurate correction in the transient state after the tool is mounted. However, the disclosure does not sufficiently describe a specific estimation method of the temperature. Additionally, Japanese Patent No. 4469325 premises a case of using a machining tool and does not assume a case where a position measurement sensor, such as a touch trigger probe, is mounted to the spindle. Regarding the estimation method of the temperature, an embodiment describes that "the estimation of the tool temperature is performed on the basis of the empirically obtained relationship, the experimentally obtained relationship, and a relationship set for each tool, for example." As an example, it is described that "briefly, the estimation of the tool temperature is, in which the temperature changes of the spindle and the temperature changes of the tool attached thereto take approximately the same temperature rise curve and the temperature fall curve, and the temperature of the tool changes varies after the set amount of time t from the temperature changes of the spindle." However, it is difficult to accurately estimate the temperature of the position measurement sensor, such as the touch trigger probe, which is used to stop the spindle in a simple delay for a certain period.

Meanwhile, for example, a method in combination of the methods of JP-A-2004-148443 and Japanese Patent No. 4469325 is considered. In this case, the combined method that defines the tool temperature immediately before the use obtained from the use history of the tool as an initial value, defines a temperature difference between the temperature near the bearing of the spindle in the machine tool and the temperature at the part where the thermal stability is high as an input temperature, and calculates the temperature change of the tool with the first-order lag expression is considered. When the heat generated during the rotation of the spindle increases the spindle temperature, it is considered that the method can accurately estimate the temperature change of the tool. However, it is considered to be difficult to estimate the temperature change, for example, in the case of using the touch trigger probe, when the tool is mounted in a process that the spindle cools after stops rotating because of the following reasons. A cooling circuit is disposed near the bearing in most cases, and after the spindle stops rotating, the temperature rapidly decreases. Therefore, even when it is regarded to be sufficiently cooled from the measured temperature near the bearing, the heat still remains in the tool-mounted portion and the heat is transmitted when the tool is mounted, possibly resulting in thermal distortion of the tool. Therefore, it is considered that, to estimate the change when the tool is mounted in the process that the spindle cools after stops rotating, the temperature change of the tool-mounted portion needs to be considered. However, since the tool-mounted portion is disposed on the shaft rotating at high speed, directly measuring the temperature is difficult. Therefore, in most cases, the temperature sensor of the spindle is mounted to a fixing portion where the temperature can be measured easily.

Accordingly, JP-A-2010-172981 describes that the temperature rise value at the part where the tool is mounted is obtained from the temperature rise value near the bearing of the spindle close to the part where the tool is mounted of the spindle. However, the disclosure assumes a proportional relationship of the instantaneous temperature rise values and does not assume a delayed change in temperature at the part where the tool is mounted. Unlike during the rotation of the spindle, the temperature near the bearing and the temperature at the tool-mounted portion while the spindle cools after the stop do not have a simple proportional relationship. Furthermore, the disclosure targets displacement caused by the drawing-in of the tool occurred at the moment of mounting the tool, and does not target thermal displacement of the tool changing in association with a lapse of time after the tool is mounted.

As described above, although the methods disclosed in JP-A-2004-148443, Japanese Patent No. 4469325, and JP-A-2010-172981 are effective to the machining tool used by rotating the spindle, the methods cannot provide sufficient effects to a reference tool and a touch trigger probe used by stopping the spindle. That is, when the spindle is rotated at high speed for machining and then the reference tool and the touch trigger probe are mounted, transmission of heat of the spindle to the reference tool and the touch trigger probe generates thermal distortion and therefore the problem of deterioration of measurement accuracy cannot be solved.

Therefore, an object of the disclosure is to provide a thermal displacement correction method and a thermal displacement correction apparatus of a machine tool that allow correcting thermal distortion of a tool and a position measurement sensor at high accuracy. The correction of thermal distortion can be performed regardless of timing of mounting the tool and the position measurement sensor, for example, when the position sensor is mounted after the spindle is rotated at high speed for machining, by which an accuracy of processing and a measurement is improved.

SUMMARY OF THE INVENTION

In order to achieve the above-described object, there is provided a thermal displacement correction method for a machine tool according to a first aspect of the disclosure. The machine tool includes a tool-mounted portion and a spindle. A tool or a position measurement sensor is removably attachable to the tool-mounted portion. The spindle is rotatable with the tool mounted. The method includes four steps describing below as (1)-(4). (1) Setting an initial tool temperature of the tool or the position measurement sensor at a time point at which the tool or the position measurement sensor is mounted to the spindle. To set the temperature, the following matters are used, which are any information of a use history of the tool or the position measurement sensor, a temperature of the tool or the position measurement sensor before the tool or the position measurement sensor is mounted to the spindle, a body temperature of the machine tool, and an ambient temperature of the machine tool. (2) Estimating a temperature of the tool or the position measurement sensor based on the initial tool temperature and a temperature of the spindle. (3) Estimating an amount of thermal displacement of the tool or the position measurement sensor with a preliminarily set tool thermal displacement estimation formula based on the temperature estimated at the preceded estimating. (4) Moving a feed shaft of the machine tool based on the estimated amount of thermal displacement to perform a correction. The second step measures the temperature of the spindle by a temperature sensor mounted to the spindle. And then, a tool-mounted portion temperature of the spindle is estimated from the measured temperature of the spindle and a tool-mounted portion temperature estimation formula. The tool-mounted portion temperature estimation formula is set differently depending on whether the spindle rotates or stops. The temperature of the tool or the position measurement sensor is estimated with the tool-mounted portion temperature, the initial tool temperature of the tool or the position measurement sensor, and the preliminarily set tool temperature estimation formula.

In a thermal displacement correction method for a machine tool according to a second aspect of the disclosure, the tool-mounted portion temperature estimation formula is set to have respective different formulae depending on whether a tool exchange is performed and whether the tool is mounted to the spindle after the rotating spindle is stopped.

In a thermal displacement correction method for a machine tool according to a third aspect of the disclosure, the tool-mounted portion temperature estimation formula is expressed by a first-order lag expression using the temperature of the spindle as an input.

In a thermal displacement correction method for a machine tool according to a fourth aspect of the disclosure, the tool temperature estimation formula and the tool thermal displacement estimation formula use estimation formulae according to a type of the tool or the position measurement sensor.

In order to achieve the above-described object, there is provided a thermal displacement correction apparatus for a machine tool according to a fifth aspect of the disclosure. The machine tool includes a tool-mounted portion and a spindle. A tool or a position measurement sensor is removably attachable to the tool-mounted portion. The spindle is rotatable with the tool mounted. The thermal displacement correction apparatus includes an initial tool temperature setting unit, a tool temperature estimating unit, an amount-of-thermal-displacement estimating unit, and a thermal displacement correcting unit. The initial tool temperature setting unit is configured to set an initial tool temperature of the tool or the position measurement sensor at a time point at which the tool or the position measurement sensor is mounted to the spindle using any information of a use history of the tool or the position measurement sensor, a temperature of the tool or the position measurement sensor before the tool or the position measurement sensor is mounted to the spindle, a body temperature of the machine tool, and an ambient temperature of the machine tool. The tool temperature estimating unit is configured to estimate a temperature of the tool or the position measurement sensor based on the initial tool temperature and a temperature of the spindle. The amount-of-thermal-displacement estimating unit is configured to estimate an amount of thermal displacement of the tool or the position measurement sensor with a preliminarily set tool thermal displacement estimation formula based on the temperature estimated by the tool temperature estimating unit. The thermal displacement correcting unit is configured to move a feed shaft of the machine tool based on the estimated amount of thermal displacement to perform a correction. The tool temperature estimating unit is configured to measure the temperature of the spindle by a temperature sensor mounted to the spindle. The tool temperature estimating unit is configured to estimate a tool-mounted portion temperature of the spindle from the measured temperature of the spindle and a tool-mounted portion temperature estimation formula. The tool-mounted portion temperature estimation formula is set differently depending on whether the spindle rotates or stops. The temperature of the tool or the position measurement sensor is estimated with the tool-mounted portion temperature, the initial tool temperature of the tool or the position measurement sensor, and the preliminarily set tool temperature estimation formula.

With the embodiments described in the first and the fifth aspects, the temperature of the tool-mounted portion, which is the mounted portion of the tool or the position measurement sensor, is estimated based on the tool-mounted portion temperature estimation formula based on the information from the temperature sensor mounted to the spindle. Then, the temperature of the tool or the position measurement sensor is estimated based on the tool temperature estimation formula based on the tool-mounted portion temperature. Further, with the use of the estimation formulae different depending on whether the spindle rotates or stops as the tool-mounted portion temperature estimation formula, the temperature of the tool-mounted portion that cools slowly after the stop of the spindle can be accurately estimated. Accordingly, when the tool and the position measurement sensor are mounted after a lapse of a certain period after the spindle is rotated at high speed, generates heat, and remains to be stopped, the temperature changes of the tool and the position measurement sensor can be estimated considering the heat remained in the tool-mounted portion at the time of mounting. Therefore, regardless of the timing of mounting the tool and the position measurement sensor, the temperature change and the thermal displacement can be highly accurately estimated and processing accuracy and measurement accuracy can be improved.

With the embodiment according to the second aspect, in addition to the above-described effects, the tool-mounted portion temperature estimation formula different depending on whether the tool exchange is performed and whether the tool is mounted to the spindle after the rotating spindle is stopped is further used. In the case where the tool is not exchanged after the stop of the spindle, the heated tool remains to attach, therefore, the temperature of the tool-mounted portion decreases gradually. Meanwhile, in the case where the tool exchange is performed after the stop of the spindle, the attachment of the cool tool deprives the heat from the tool-mounted portion, and thus the temperature quickly decreases. By reflecting the effect to the tool-mounted portion temperature estimation formula, even when the tool exchange is performed at any timing, the thermal displacement of the tool and the position measurement sensor can be accurately estimated.

With the embodiment according to the third aspect, in addition to the above-described effects, since the tool-mounted portion temperature estimation formula is expressed by the simple estimation formula, the first-order lag expression, with the use of the spindle temperature as the input, the parameter setting is simplified and the calculation load can be reduced.

With the embodiment according to the fourth aspect, in addition to the above-described effects, even if there is a difference in the thermal property and dimensions of the tool and the position measurement sensor, the temperature change and the thermal displacement can be highly accurately estimated. This is because of the use of the tool temperature estimation formula and the tool thermal displacement estimation formula depending on the type of tool or the type of position measurement sensor.

DETAILED DESCRIPTION OF THE INVENTION

The following describes embodiments of the disclosure with reference to the drawings.

Figure 1:
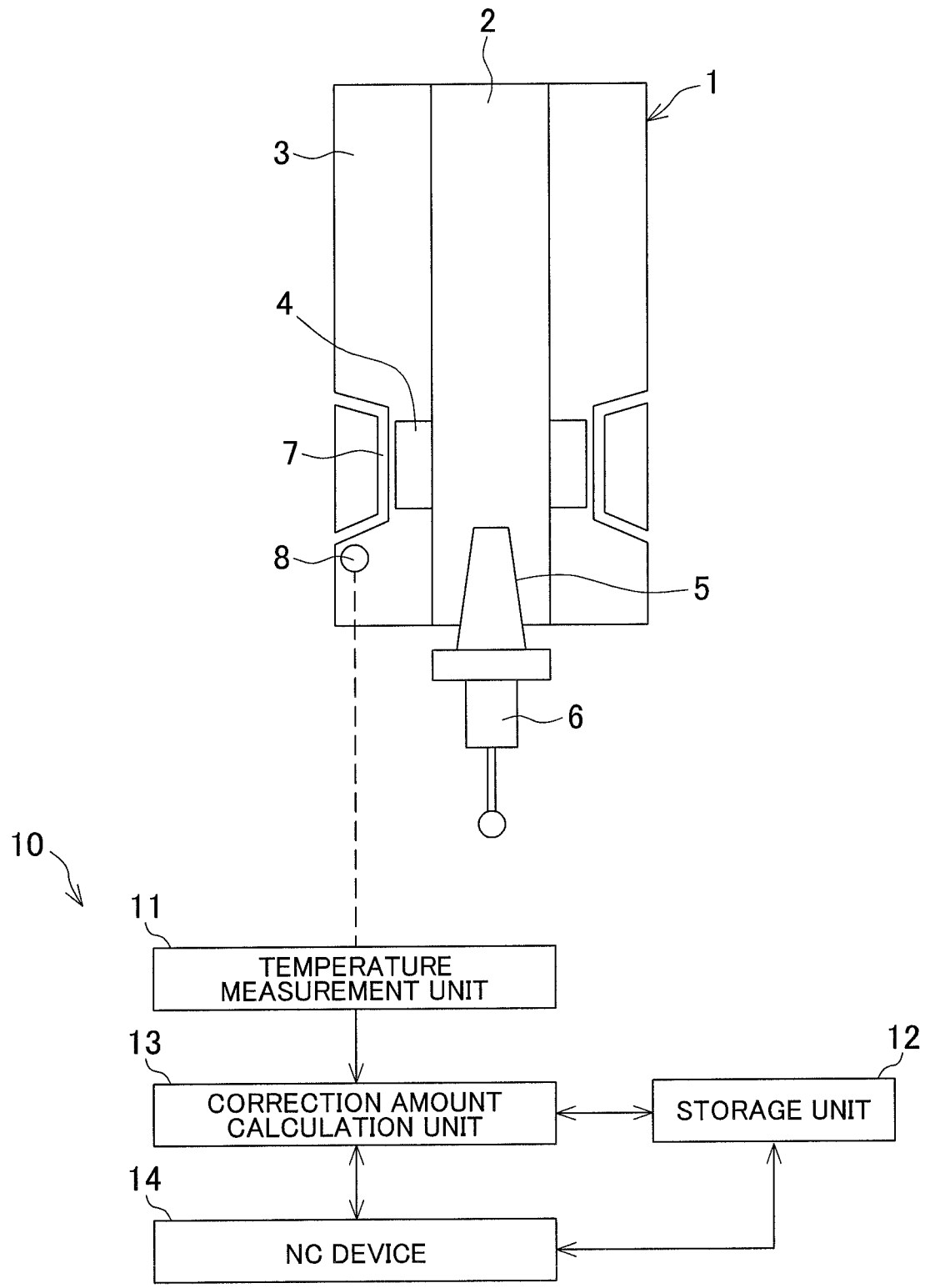
FIG. 1 is a conceptual diagram of a spindle and a thermal displacement correction apparatus in a machining center to which the disclosure is applied.

FIG. 1 schematically illustrates a spindle 1 in a machining center to which the disclosure is applied. The spindle 1 includes a rotation shaft 2 and a fixing portion 3 (housing). A bearing 4 is interposed between the rotation shaft 2 and the fixing portion 3 and generates heat during a rotation of the rotation shaft 2. A tool-mounted portion 5 as a mounted portion is disposed on a distal end of the rotation shaft 2, and a tool and a position measurement sensor are mounted to the tool-mounted portion 5. In the drawing, a touch trigger probe 6 as a position measurement sensor is mounted.

In the fixing portion 3 near the bearing 4, a cooling circuit 7 that flows cooling oil to reduce an influence from heat generation is disposed, and a spindle temperature sensor 8 that senses a temperature change due to the influence from heat generated in the bearing 4 is mounted. Temperature information obtained by the spindle temperature sensor 8 is used to estimate and correct thermal displacement.

The machining center includes a thermal displacement correction apparatus 10 including a temperature measurement unit 11, a storage unit 12, a correction amount calculation unit 13, and an NC device 14. The temperature measurement unit 11 measures a temperature from output data from the spindle temperature sensor 8. The storage unit 12 stores a tool-mounted portion temperature estimation formula, a tool temperature estimation formula, a tool thermal displacement estimation formula, and parameters used for the respective formulae described later, and the like. The correction amount calculation unit 13 estimates a temperature of the tool-mounted portion 5 and a temperature of the tool or the touch trigger probe 6. The estimation made by using the temperature information obtained from the temperature measurement unit 11 and the respective estimation formulae stored in the storage unit 12. Then, the correction amount calculation unit 13 operates an amount of thermal displacement of the tool or the touch trigger probe 6. The NC device 14 corrects a command value to the spindle 1 based on the amount of thermal displacement operated by the correction amount calculation unit 13.

Here, the correction amount calculation unit 13 functions as respective initial tool temperature setting means, tool temperature estimating means, and amount-of-thermal-displacement estimating means of the disclosure, and the NC device 14 functions as thermal displacement correcting means.

When the spindle 1 is rotated and heat is generated in the bearing 4, the heat is transmitted to the rotation shaft 2 and the tool-mounted portion 5 and further transmitted to the mounted tool and touch trigger probe 6. Because of a thermal conductive property of the spindle 1 and the tool, the temperature of the tool-mounted portion 5 increases in a delay. In the case where the spindle 1 is stopped after the rotation, the bearing 4 is rapidly cooled by an effect of the cooling circuit 7. However, an influence of the heat generation remains long in the tool-mounted portion 5, which is away from the cooling circuit 7, and the temperature decreases slowly in the tool-mounted portion 5. Accordingly, there is a difference between a detected temperature by the spindle temperature sensor 8 mounted to the fixing portion 3 and an actual temperature of the tool-mounted portion 5. Furthermore, in the case where the tool is not exchanged after the stop of the spindle 1, the tool to which the heat generated during the rotation of the spindle 1 is transmitted and heated remains to attach. Therefore, the temperature of the tool-mounted portion 5 gradually decreases. Meanwhile, in the case where the tool is removed after the spindle 1 is stopped, by the tool-mounted portion 5 touching the air, the heat of the tool-mounted portion 5 is deprived, and the temperature of the tool-mounted portion 5 quickly decreases. Further, in a case where the tool is exchanged and a tool in a cool state is mounted, since the heat of the tool-mounted portion 5 moves to the tool, the temperature of the tool-mounted portion 5 decreases further quickly. Thus, a tendency of the temperature changes of the tool-mounted portion 5 changes depending on whether the tool is mounted and whether the tool is exchanged after the stop of the spindle 1.

Figure 2:
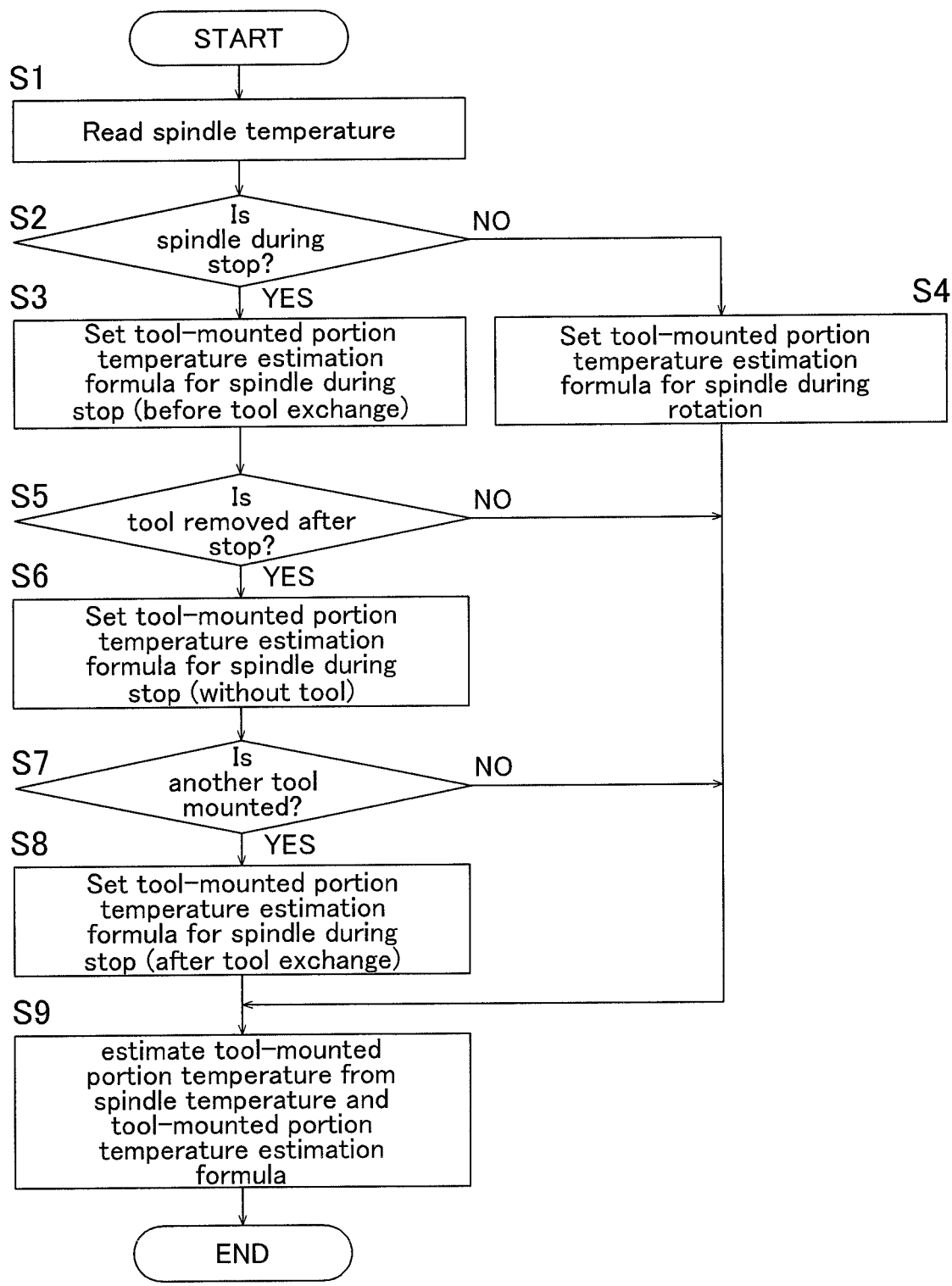
FIG. 2 is a flowchart depicting processes to estimate a tool-mounted portion temperature according to the disclosure.
Figure 3:
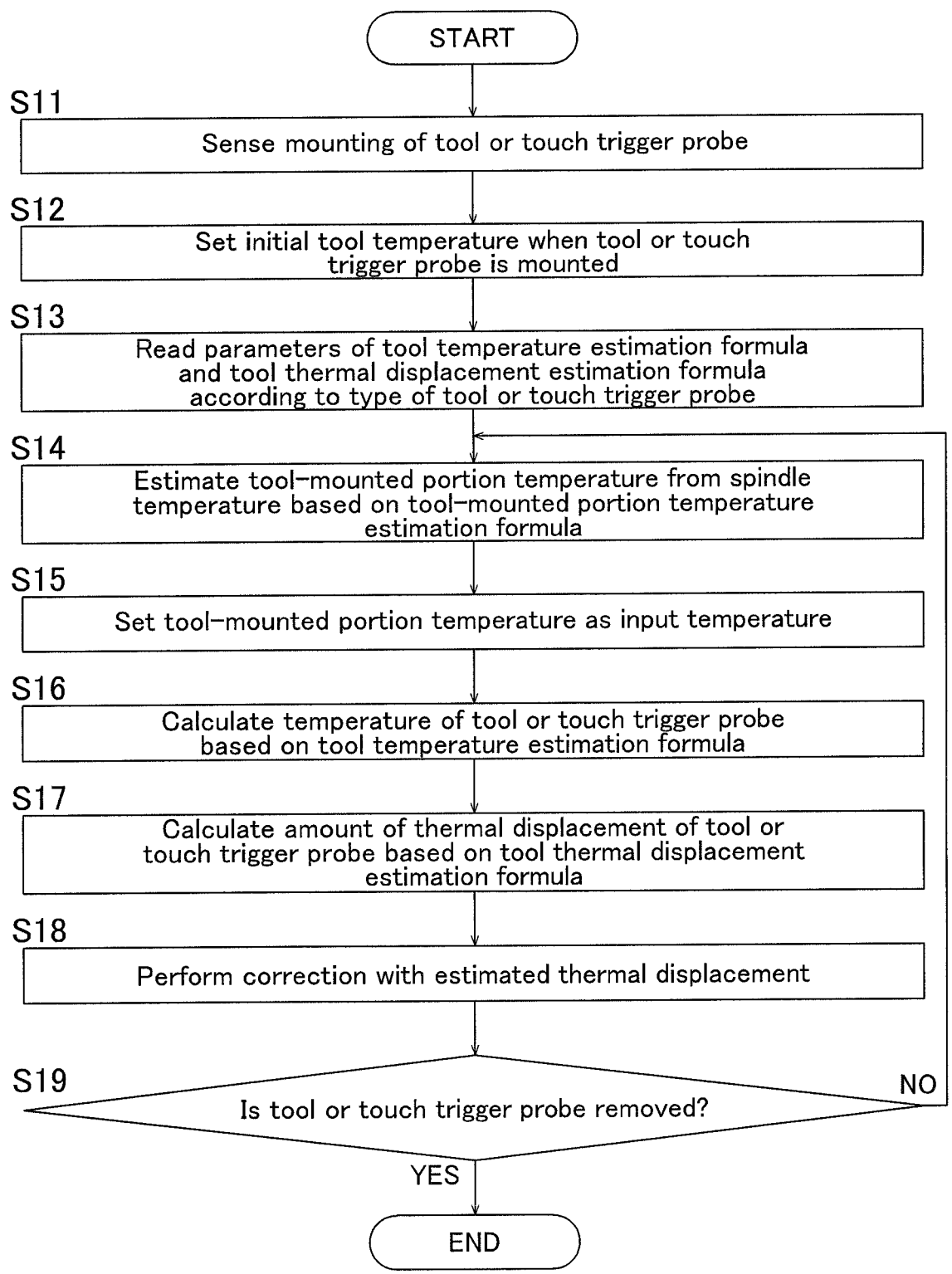
FIG. 3 is a flowchart depicting a flow of a thermal displacement correction method according to the disclosure.

Considering the difference between the measured temperature of the spindle 1 and the measured temperature of the tool-mounted portion 5, the disclosure accurately estimates the temperatures of the tool and the touch trigger probe 6 and corrects the thermal displacement. Here, FIG. 2 depicts a flowchart of a process for estimating a tool-mounted portion temperature. Next, FIG. 3 depicts a flowchart of processes for estimating the temperatures and the thermal displacement of the tool and the touch trigger probe 6 from the tool-mounted portion temperature estimated in FIG. 2 and performing correction.

First, the process of FIG. 2 sets the optimal tool-mounted portion temperature estimation formula according to the state of the spindle 1 and estimates the temperature of the tool-mounted portion 5.

As described above, by the thermal conductive property of the spindle 1, the temperature of the tool-mounted portion 5 changes delayed to the temperature near the bearing 4. This delay is expressed by the tool-mounted portion temperature estimation formula of a first-order lag expression, for example, as shown in Formula 1, thereby ensuring estimating the temperature of the tool-mounted portion 5 from the temperature of the spindle 1 detected by the spindle temperature sensor 8.

[Math. 1]

$$\theta_P(n) = \theta_P(n-1) + \frac{\Delta t}{\Delta t + T_S}\{\theta_S(n) - \theta_P(n-1)\} \quad \text{Formula 1}$$

$\theta_P$ (n): Tool-mounted portion temperature (current value)
$\theta_P$ (n−1): Tool-mounted portion temperature (Δt past value)
$\theta_S$(n): Detected temperature by spindle temperature sensor (current value)
θt: Time cycle of calculation
$T_S$: Time constant representing delay of temperature change of tool-mounted portion The time constant $T_S$ representing the delay of the temperature change of the tool-mounted portion 5 is a parameter in Formula 1, and when the calculation is performed, the value needs to be preliminarily determined. Determining the value according to the state of the spindle 1 allows estimating the temperature of the tool-mounted portion 5 at high accuracy. In the disclosure, different values are set to the time constant $T_S$ between during the rotation of the spindle 1 and during the stop. Furthermore, the different values are set to the time constant $T_S$ between in the case of performing the tool exchange after the stop of the spindle 1 and not performing the tool exchange. While the respective time constants $T_S$ are preliminarily determined through experiment and the like, usually, the temperature of the tool-mounted portion 5 during stop gradually changes compared with that during rotation. As a result, the value of the time constant is large. Additionally, when the tool is exchanged after the stop of the spindle 1, the transmission of the heat to the cool tool quickly decreases the temperature of the tool-mounted portion 5. Therefore, the time constant is small compared with that in the case of not performing the tool exchange after the stop of the spindle 1.

The following further describes the flow of the process with reference to the flow of FIG. 2.

First, a spindle temperature is read at S1. Here, the spindle temperature is obtained from the temperature measured by the spindle temperature sensor 8 of FIG. 1. The measured temperature may be used as it is or a filtering process and the like may be performed as necessary. Additionally, a temperature of a body at a part not affected by room temperature and the heat generated in the spindle may be defined as a reference temperature, and a difference between the measured spindle temperature and the measured reference temperature may be defined as the spindle temperature.

Next, whether the spindle 1 is during stop or during rotation is determined at S2. This determination is performed based on a control command to a spindle motor, a signal from an encoder sensing the rotation, and the like.

In the case where the spindle is during stop by the determination of S2, the tool-mounted portion temperature estimation formula for the spindle during stop (before tool exchange) is set at S3. In this Embodiment, a value corresponding to the spindle during stop (before tool exchange)

is set to the time constant $T_S$ representing the delay of the temperature change of the tool-mounted portion 5 in the above-described Formula 1.

Similarly, in the case where the spindle is rotating, the tool-mounted portion temperature estimation formula for the spindle during rotation is set at S4. In this Embodiment, a value corresponding to the spindle during rotation is set to the time constant $T_S$ representing the delay of the temperature change of the tool-mounted portion 5 in Formula 1.

Next, while the spindle stops, whether the tool is removed after the spindle 1 is stopped last is determined at S5. Here, in the case where the tool is not removed, the formula remains to be the tool-mounted portion temperature estimation formula for the spindle during stop (before tool exchange). Meanwhile, in the case where the tool is removed, the formula is switched to the tool-mounted portion temperature estimation formula for the spindle during stop (without the tool) at S6. In this Embodiment, a value corresponding to the spindle during stop (without the tool) is set to the time constant $T_S$ representing the delay of the temperature change of the tool-mounted portion 5 in Formula 1.

Meanwhile, when the tool is removed, whether another tool is mounted to the spindle 1 is determined at S7. In a case where another tool is not mounted and a tool remains to be not mounted to the spindle 1, the formula remains to be the tool-mounted portion temperature estimation formula for the spindle during stop (without the tool). However, when another tool is mounted, the formula is switched to the tool-mounted portion temperature estimation formula for the spindle during stop (after tool exchange) at S8. In this Embodiment, a value corresponding to the spindle during stop (after tool exchange) is set to the time constant $T_S$ representing the delay of the temperature change of the tool-mounted portion 5 in Formula 1.

Finally, at S9, using the spindle temperature read at S1 and the tool-mounted portion temperature estimation formula according to the state of the spindle 1 determined from S2 to S8, the tool-mounted portion temperature is estimated.

Additionally, in this Embodiment, while the simple first-order lag expression like Formula 1 is used for the tool-mounted portion temperature estimation formula and the time constant $T_S$, which represents the delay of the temperature change of the tool-mounted portion 5, is changed so as to correspond to the different state of the spindle 1. However, the tool-mounted portion temperature estimation formula may be a formula in another form, such as a matrix based on a finite element model of heat conduction. Moreover, one parameter is not changed according to a condition, but the estimation formula itself may be set as another formula.

Furthermore, in this embodiment, the four kinds of formulae are switched according to the four conditions, "during stop (before tool exchange)," "during stop (without the tool)," "during stop (after tool exchange)." Alternatively, "during rotation," the formulae may be switched according to two patterns, "during rotation" and "during stop," or may be switched according to three patterns, "during rotation," "during stop (before tool exchange)," and "during stop (after tool exchange)."

Next, from the tool-mounted portion temperature estimated in FIG. 2, the temperatures and the thermal displacement of the tool and the touch trigger probe are estimated and the thermal displacement is performed. The following describes the method following the flowchart of FIG. 3.

First, at S11, the mounting of the tool or the touch trigger probe to the spindle 1 is sensed. This process is performed by sensing a movement of a clamp member (not illustrated) that clamps the tool or the touch trigger probe, a pressure of air supplied to a seated surface of the tool or the touch trigger probe, or the like.

Next, at S12, the initial tool temperature when the tool or the touch trigger probe is mounted is set (initial tool temperature setting step). For example, when the tool is exchanged, the estimated tool temperature calculated until then is reset and the estimated tool temperature is set to the initial tool temperature. As the method for setting the initial tool temperature, for example, a method that disposes a temperature sensor in a tool magazine and sets the temperature as the initial tool temperature is considered. Additionally, as described in JP-A-2004-148443, the initial tool temperature may be calculated based on a use history of the tool (or the touch trigger probe). The initial tool temperature may be calculated using the body temperature of the machine tool and ambient temperature.

Next, at S13, parameters of the tool temperature estimation formula and the tool thermal displacement estimation formula preliminarily stored in the storage unit 12 according to the type of the tool or the touch trigger probe are read. That is, preliminarily setting the parameters according to the types of the tool and the touch trigger probe allows accurately estimating the temperatures and the thermal displacement according to the tool and the touch trigger probe.

Next, at S14, based on the read parameters and tool-mounted portion temperature estimation formula, the tool-mounted portion temperature is estimated from the spindle temperature. That is, following the flowchart of FIG. 2, the tool-mounted portion temperature estimation formula different depending on whether the spindle 1 rotates or stops and whether to perform the tool exchange is set to estimate the tool-mounted portion temperature.

Next, the tool-mounted portion temperature estimated at S14 is set as an input temperature at S15. That is, the tool-mounted portion temperature $\theta_p$ obtained by Formula 1 is set as the input temperature. At a time point at which the tool is mounted, the tool-mounted portion temperature $\theta_p$ becomes effective as the input temperature. That is, when the spindle 1 generates heat and the tool is mounted in a state where the tool-mounted portion temperature $\theta_p$ is high, the input temperature to the tool becomes high. Conversely, when the spindle 1 is sufficiently cooled and the tool is mounted in a state where the tool-mounted portion temperature $\theta_p$ returns to an ordinary temperature, the input temperature to the tool becomes low.

Next, at S16, based on the tool temperature estimation formula, the temperature of the tool or the touch trigger probe is calculated from the spindle temperature read at S1 of FIG. 2 (S13 to S16: tool temperature estimating step).

That is, the tool-mounted portion temperature $\theta_p$ estimated at S14 is transmitted to the tool or the touch trigger probe through a contact surface, and thus the temperature of the tool or the touch trigger probe changes. The temperature change is expressed by the tool temperature estimation formula. As an example of the estimation formula, the following Formula 2 of a first-order lag expression similar to Formula 1 is considered.

[Math. 2]

$$\theta_t(n) = \theta_t(n-1) + \frac{\Delta t}{\Delta t + T_t}\{\theta_p(n) - \theta_t(n-1)\} \quad \text{Formula 2}$$

$\theta_t(n)$: Temperature of tool or touch trigger probe (current value)

$\theta_t(n-1)$: Temperature of tool or touch trigger probe ($\Delta t$ past value)

$\theta_p(n)$: Tool-mounted portion temperature (current value)

$\Delta t$: Time cycle of calculation $T_t$: Time constant representing delay of temperature change of tool or touch trigger probe The time constant $T_t$ representing the delay of the temperature change of the tool or the touch trigger probe is a parameter in Formula 2, and when the calculation is performed, the value needs to be preliminarily determined according to the type of the tool or the touch trigger probe. While Formula 2 is one example of the tool temperature estimation formula, other information, such as a spindle rotation speed and a temperature of a working space, may be used for the tool temperature estimation formula. Additionally, a method that calculates a temperature distribution of the tool with a matrix based on a finite element model and the like, not the simple formula like Formula 2, is also considered.

Next, at S17, based on the tool thermal displacement estimation formula, the amount of thermal displacement of the tool or the touch trigger probe is calculated (amount-of-thermal-displacement estimating step).

That is, based on the temperature of the tool or the touch trigger probe estimated at S16, the thermal displacement of the tool or the touch trigger probe is calculated. For example, like the following Formula 3, the tool thermal displacement estimation formula is expressed by a formula that multiplies the temperature by a proportionality coefficient.

[Math. 3]

$$\Delta Z_t(n) = K_t \theta_t(n) \quad \text{Formula 3}$$

$\Delta Z_t(n)$: Thermal displacement of tool or touch trigger probe $\theta_t(n)$: Temperature of tool or touch trigger probe $K_t$: Proportionality coefficient The proportionality coefficient $K_t$ is a parameter in Formula 3, and when the calculation is performed, the value needs to be preliminarily determined according to the type of the tool or the touch trigger probe.

Next, at S18, correction is performed with the estimated thermal displacement (thermal displacement correcting step). That is, a feed shaft is moved by the thermal displacement estimated at S17 and a measurement point of a tool cutting edge or the touch trigger probe is corrected.

Next, at S19, whether the tool or the touch trigger probe is removed is determined. When the tool or the touch trigger probe is removed here, the process is ended. When the tool or the touch trigger probe is mounted, the processes from S14 to S18 are repeated at the time cycle $\Delta t$.

By the flow described above, the thermal displacement of the tool or the touch trigger probe mounted to the spindle 1 can be accurately estimated. There are the three parameters in this Embodiment, the time constant $T_S$, which represents the delay of the temperature change of the tool-mounted portion 5 in Formula 1, the time constant $T_t$, which represents the delay of the temperature change of the tool or the touch trigger probe in Formula 2, and the proportionality coefficient $K_t$ in Formula 3. These parameters are preliminarily set based on experiment and analysis.

Figure 4:
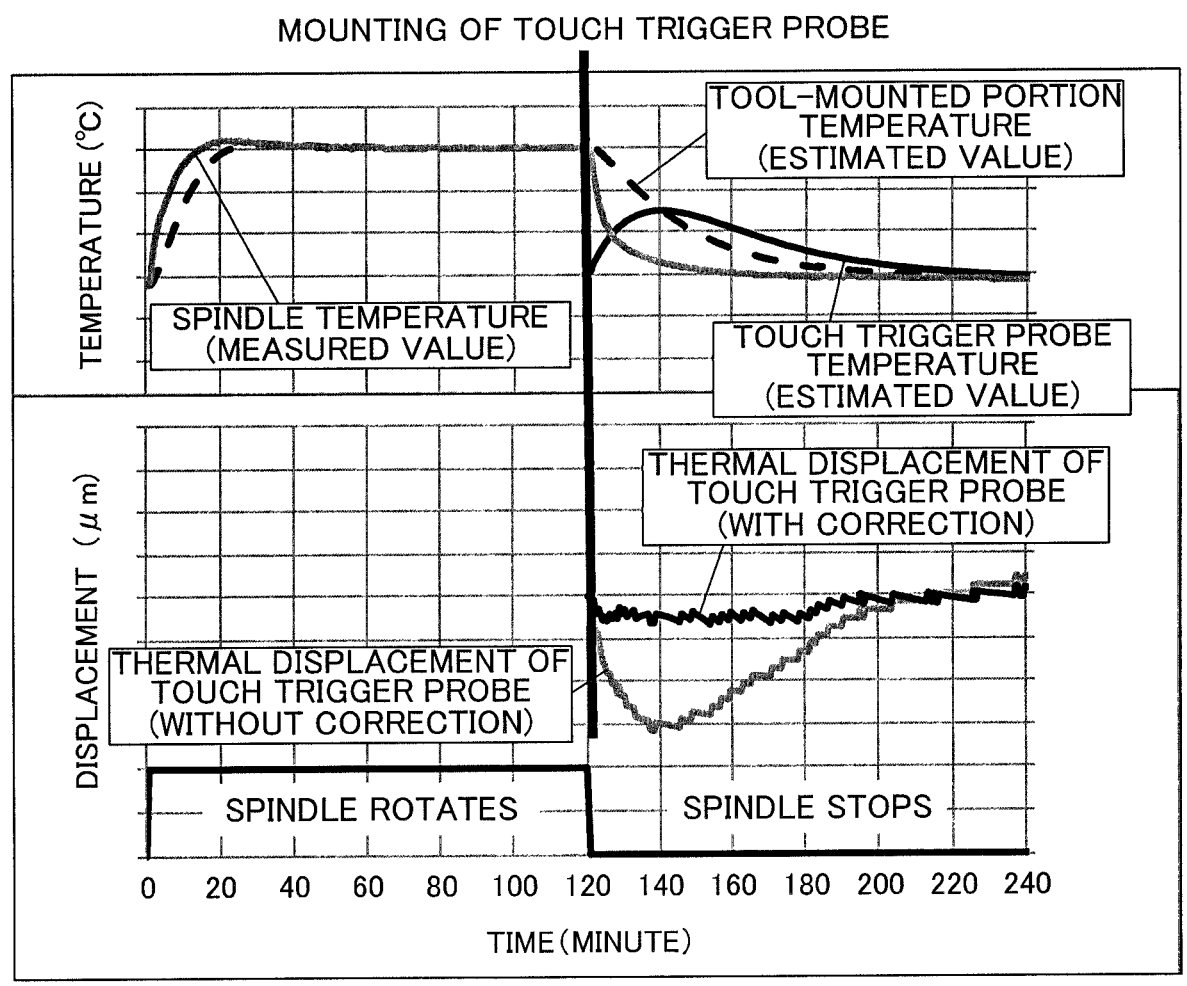
FIG. 4 is a graph illustrating an example in which a temperature and thermal displacement when a touch trigger probe is mounted immediately after a stop of the spindle are estimated and an amount of correction is calculated.
Figure 5:
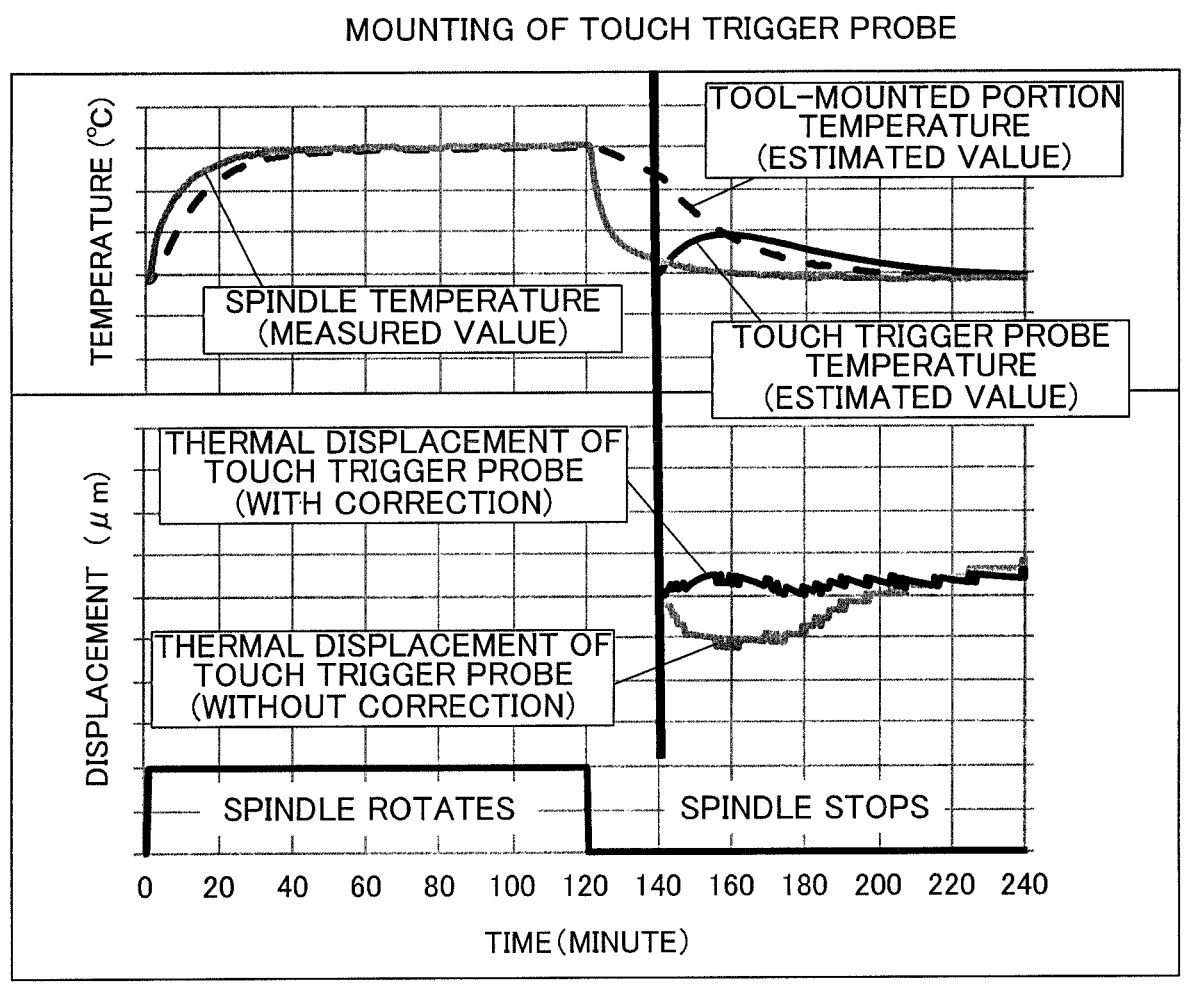
FIG. 5 is a graph illustrating an example in which the temperature and the thermal displacement when the touch trigger probe is mounted after a lapse of 20 minutes after the stop of the spindle are estimated and the amount of correction is calculated.

The following describes an example of estimating and correcting the temperature and the thermal displacement in the flow of FIG. 3 with reference to graphs of FIG. 4 and FIG. 5. In both cases, it is illustrated that a change in position when a predetermined position is repeatedly measured after the spindle 1 is rotated for 120 minutes to generate heat and then replaced with the touch trigger probe 6. FIG. 4 illustrates a case where the touch trigger probe 6 is mounted immediately after the stop of the spindle 1, and FIG. 5 illustrates a case where the spindle 1 is stopped and the touch trigger probe 6 is mounted after a lapse of 20 minutes.

When the touch trigger probe 6 is mounted immediately after the stop of the spindle 1, since the temperature of the tool-mounted portion 5 is high and an amount of heat flowing in the touch trigger probe 6 increases, the thermal displacement increases. Meanwhile, when the touch trigger probe 6 is mounted after a lapse of 20 minutes, although the thermal displacement decreases compared with that in the case of mounting immediately after the stop, the thermal displacement still remains. It can be seen that, when the thermal displacement correction is not performed, it is necessary to wait for a long time from when the stop of the spindle 1 to eliminate the influence by the thermal displacement.

While the spindle 1 is rotated, due to the influence from the heat generated in the bearing 4 or the like, the temperature of the spindle 1 detected by the spindle temperature sensor 8 increases as indicated by the gray solid line. Meanwhile, when the spindle 1 is stopped, the temperature rapidly decreases due to the cooling effect, and in the case of the spindle 1 described in this Embodiment, the temperature returns to the original temperature in about 20 minutes. However, when replaced with the touch trigger probe 6 in this state, thermal displacement occurs. Since the temperature of the tool-mounted portion 5 decreases delayed to the temperature of the spindle 1 detected by the spindle temperature sensor 8 as indicated by the dashed line in the graph, this phenomenon occurs by flowing the heat remained in the tool-mounted portion 5 in the touch trigger probe 6. Moreover, as indicated by the dashed line in the graph, the temperature of the tool-mounted portion 5 exhibits the temperature change close to the temperature of the spindle 1 detected by the spindle temperature sensor 8 while the spindle rotates, however, while the spindle stops, the temperature changes significantly delayed to that of the spindle 1 detected by the spindle temperature sensor 8. When the spindle 1 is stopped and then the tool is exchanged, the cool tool mounted to the spindle 1 deprives the heat of the spindle 1, therefore, compared with the case where the tool is not exchanged, the temperature of the tool-mounted portion 5 quickly decreases. It can be seen from the dashed line in the graph of FIG. 5 that the temperature changes after mounting becomes faster than that before mounting the touch trigger probe.

However, the estimation of the temperature changes of the tool-mounted portion 5 based on Formula 1 allows representing a difference in heat flowing in the touch trigger probe 6 that changes depending on a timing of mounting. At this time, the time constant $T_S$, which represents the delay of the temperature change of the tool-mounted portion 5 in Formula 1, is changed depending on whether the spindle 1 is during rotation or during stop or whether the tool is exchanged after the stop of the spindle, thus ensuring accurately obtaining the temperature change according to the situation. Further, the temperature changes of the touch trigger probe 6 that changes depending on the heat flowing from the tool-mounted portion 5 in the spindle 1 is calculated with Formula 2, and the value is converted into the amount of displacement with Formula 3 to perform the process of estimating the thermal displacement. Accordingly, as illustrated in FIG. 4 and FIG. 5, a correction accuracy can be high regardless of the timing of mounting the touch trigger probe 6.

As described above, by the thermal displacement correction apparatus 10 and the thermal displacement correction method, the temperature of the tool-mounted portion 5 is estimated by using the tool-mounted portion temperature estimation formula based on the information from the spindle temperature sensor 8. Further, the temperature of the tool or the touch trigger probe 6 is estimated by using the tool temperature estimation formula depending on the estimated tool-mounted portion temperature. Accordingly, when the tool and the touch trigger probe 6 are mounted following a lapse of a certain period after the spindle 1 is rotated at high speed and generates heat, the temperature changes of the tool and the touch trigger probe 6 can be estimated considering the heat remained in the tool-mounted portion 5 at the time of mounting. Therefore, regardless of the timing of mounting the tool and the touch trigger probe 6, the temperature change and the thermal displacement can be highly accurately estimated and accuracy of processing and measurement can be improved.

Especially here, in the tool temperature estimating step at S13 and S14, since the estimation formula depending on the type of the tool or the touch trigger probe 6 is used, the temperature change and the thermal displacement can be highly accurately estimated by reflecting the difference in thermal property and dimensions of the tool and the touch trigger probe 6.

The parameter setting is simplified and the calculation load can be reduced since the tool-mounted portion temperature estimation formula is expressed by the simple estimation formula which is the first-order lag expression with the use of the spindle temperature.

Furthermore, in the tool temperature estimating step at S16, the parameter setting is simplified and the calculation load can be reduced since the tool temperature estimation formula is expressed by the simple estimation formula which is the first-order lag expression with the use of the tool-mounted portion temperature.

It should be noted that while only one spindle temperature sensor is described in the configurations, a plurality of spindle temperature sensors may be installed at different positions and an average value of the temperature information of all of the spindle temperature sensors may be used as the spindle temperature with no problem. The machine tool is not limited to the machining center.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A thermal displacement correction method for a machine tool including a tool-mounted portion and a spindle, a tool or a position measurement sensor being removably attachable to the tool-mounted portion, the spindle being rotatable with the tool mounted, the method comprising:

setting an initial tool temperature of the tool or the position measurement sensor at a time point when the tool or the position measurement sensor is mounted to the spindle using any information of a use history of the tool or the position measurement sensor, a temperature of the tool or the position measurement sensor before the tool or the position measurement sensor is mounted to the spindle, a body temperature of the machine tool, and an ambient temperature of the machine tool;

estimating a temperature of the tool or the position measurement sensor based on the initial tool temperature and a temperature of the spindle;

estimating an amount of thermal displacement of the tool or the position measurement sensor with a preliminarily set tool thermal displacement estimation formula depending on the temperature estimated at the preceded estimating; and moving a feed shaft of the machine tool based on the estimated amount of thermal displacement to perform a correction, wherein the temperature of the spindle is measured by a temperature sensor mounted to a fixing portion of the spindle, then a tool-mounted portion temperature of the spindle is estimated from the measured temperature of the spindle and a tool-mounted portion temperature estimation formula being set differently depending on whether the spindle rotates or stops, and the temperature of the tool or the position measurement sensor is estimated with the tool-mounted portion temperature, the initial tool temperature of the tool or the position measurement sensor, and the preliminarily set tool temperature estimation formula.

2. The thermal displacement correction method for the machine tool according to claim 1, wherein the tool-mounted portion temperature estimation formula is set to have respective different formulae depending on whether a tool exchange is performed and whether the tool is mounted to the spindle after the rotating spindle is stopped.

3. The thermal displacement correction method for the machine tool according to claim 1, wherein the tool-mounted portion temperature estimation formula is expressed by a first-order lag expression using the temperature of the spindle as an input.

4. The thermal displacement correction method for the machine tool according to claim 1, wherein the tool temperature estimation formula and the tool thermal displacement estimation formula use estimation formulae according to a type of the tool or the position measurement sensor.

5. A thermal displacement correction apparatus for a machine tool including a tool-mounted portion and a spindle, a tool or a position measurement sensor being removably attachable to the tool-mounted portion, the spindle being rotatable with the tool mounted, the thermal displacement correction apparatus comprising:

an initial tool temperature setting unit configured to set an initial tool temperature of the tool or the position measurement sensor at a time point at which the tool or the position measurement sensor is mounted to the spindle using any information of a use history of the tool or the position measurement sensor, a temperature of the tool or the position measurement sensor before the tool or the position measurement sensor is mounted to the spindle, a body temperature of the machine tool, and an ambient temperature of the machine tool;

a tool temperature estimating unit configured to estimate a temperature of the tool or the position measurement sensor based on the initial tool temperature and a temperature of the spindle;

an amount-of-thermal-displacement estimating unit configured to estimate an amount of thermal displacement of the tool or the position measurement sensor with a preliminarily set tool thermal displacement estimation formula based on the temperature estimated by the tool temperature estimating unit; and a thermal displacement correcting unit configured to move a feed shaft of the machine tool based on the estimated amount of thermal displacement to perform a correction, wherein the tool temperature estimating unit is configured to measure the temperature of the spindle by a temperature sensor mounted to a fixing portion of the spindle, the tool temperature estimating unit being configured to estimate a tool-mounted portion temperature of the spindle from the measured temperature of the spindle and a tool-mounted portion temperature estimation formula, the tool-mounted portion temperature estimation formula being set differently depending on whether the spindle rotates or stops, and the temperature of the tool or the position measurement sensor is estimated with the tool-mounted portion temperature, the initial tool temperature of the tool or the position measurement sensor, and the preliminarily set tool temperature estimation formula.

* * * * *